(12) United States Patent
Baldemair et al.

(10) Patent No.: US 11,757,498 B2
(45) Date of Patent: Sep. 12, 2023

(54) ACKNOWLEDGEMENT SIGNALING FOR RADIO ACCESS NETWORKS

(71) Applicant: Telefonaktiebolaget LM Ericsson (publ), Stockholm (SE)

(72) Inventors: Robert Baldemair, Solna (SE); Daniel Chen Larsson, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 107 days.

(21) Appl. No.: 16/763,320

(22) PCT Filed: Nov. 17, 2017

(86) PCT No.: PCT/SE2017/051146
§ 371 (c)(1),
(2) Date: May 12, 2020

(87) PCT Pub. No.: WO2019/098896
PCT Pub. Date: May 23, 2019

(65) Prior Publication Data
US 2020/0295810 A1 Sep. 17, 2020

(51) Int. Cl.
*H04B 7/0456* (2017.01)
*H04L 1/00* (2006.01)
*H04L 1/1812* (2023.01)

(52) U.S. Cl.
CPC ......... *H04B 7/0478* (2013.01); *H04L 1/0073* (2013.01); *H04L 1/1812* (2013.01)

(58) Field of Classification Search
CPC ... H04B 7/0478; H04L 1/0073; H04L 1/1812; H04L 1/1671; H04L 1/1822; H04L 1/1864
See application file for complete search history.

(56) References Cited

U.S. PATENT DOCUMENTS

2010/0322331 A1* 12/2010 Sun .................. H04B 7/0626
375/260
2012/0314590 A1 12/2012 Choudhury et al.
(Continued)

FOREIGN PATENT DOCUMENTS

CN 104144007 A 11/2014
CN 105812033 A 7/2016
(Continued)

OTHER PUBLICATIONS

Japanese Office Action and English Translation dated Jun. 29, 2021 for Japanese Patent Application No. 2020-526540, consisting of 6-pages.
(Continued)

*Primary Examiner* — Abdullahi Ahmed
(74) *Attorney, Agent, or Firm* — Christopher & Weisberg, P.A.

(57) ABSTRACT

There is disclosed a method of operating a feedback radio node in a radio access network, the feedback radio node being configured with a set of feedback codebooks. Each codebook of the set indicates an arrangement of one or more subpatterns of feedback bits into feedback information. The method includes transmitting feedback signaling representing feedback information determined based on a codebook selected from the set of feedback codebooks. The disclosure also pertains to related methods and devices.

20 Claims, 5 Drawing Sheets

(56) References Cited

U.S. PATENT DOCUMENTS

| | | | |
|---|---|---|---|
| 2014/0226702 A1* | 8/2014 | Onggosanusi | H04B 7/0417 |
| | | | 375/219 |
| 2017/0149549 A1* | 5/2017 | Wang | H04B 7/0452 |
| 2018/0123767 A1* | 5/2018 | Islam | H04L 1/189 |
| 2018/0323907 A1* | 11/2018 | Takeda | H04L 1/1812 |
| 2019/0007959 A1* | 1/2019 | Hwang | H04W 72/0446 |
| 2019/0021088 A1* | 1/2019 | Zhang | H04W 72/12 |
| 2019/0150122 A1* | 5/2019 | Ying | H04W 72/14 |
| | | | 370/329 |
| 2019/0363840 A1* | 11/2019 | Wang | H04L 1/1822 |
| 2020/0295886 A1* | 9/2020 | Gou | H04L 1/1861 |
| 2020/0374040 A1* | 11/2020 | Lou | H04L 1/1812 |
| 2021/0176011 A1* | 6/2021 | Lei | H04L 1/1614 |
| 2021/0226740 A1* | 7/2021 | Lei | H04L 1/1864 |

FOREIGN PATENT DOCUMENTS

| | | | |
|---|---|---|---|
| JP | 2017092615 A | | 5/2017 |
| KR | 20160117253 | | 10/2016 |
| WO | 2010042235 A1 | | 4/2010 |
| WO | 2017030489 A1 | | 2/2017 |
| WO | 2017050265 A1 | | 3/2017 |

OTHER PUBLICATIONS

International Search Report and Written Opinion dated Aug. 7, 2018 for International Application No. PCT/SE2017/051146 filed on Nov. 17, 2017, consisting of 10-pages.

Chinese Office Action and English Summary dated Aug. 19, 2022 for Application No. 201780098186.0, consisting of 11 pages.

\* cited by examiner

ACKNOWLEDGEMENT SIGNALING FOR RADIO ACCESS NETWORKS

CROSS-REFERENCE TO RELATED APPLICATIONS

This application is a Submission Under 35 U.S.C. § 371 for U.S. National Stage Patent Application of International Application Number: PCT/SE2017/051146, filed Nov. 17, 2017 entitled "ACKNOWLEDGEMENT SIGNALING FOR RADIO ACCESS NETWORKS," the entirety of which is incorporated herein by reference.

TECHNICAL FIELD

This disclosure pertains to wireless or telecommunication communication technology, in particular to radio access technology, e.g. for mobile communication.

BACKGROUND

Currently, radio telecommunication technology of $5^{th}$ Generation is being developed, with the goal to serve a large variety of use cases. Accordingly, the related systems have to be very flexible, and new kinds of signaling and information may be required to be transmitted. However, flexibility in many cases incurs signaling overhead, which should be avoided or limited for good performance.

This is particularly relevant for acknowledgement signaling processes, which are used to ensure correct reception of transmitted data and thus are run in parallel to many transmissions.

SUMMARY

It is an object of this disclosure to provide approaches allowing flexible acknowledgement signaling with limited signaling overhead, in particular with limited overhead on dynamic control signaling. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution. It should be noted that in the following, the terms data (sub) structure and data block (sub)structure may be considered to be used synonymously.

There is generally disclosed a method of operating a feedback radio node in a radio access network, the feedback radio node being configured with a set of feedback codebooks. Each codebook in the set indicates an arrangement of one or more subpatterns of feedback bits into feedback information. The method comprises transmitting feedback signaling representing feedback information determined based on a codebook selected from the set of feedback codebooks.

Moreover, a feedback radio node for a radio access network is disclosed. The feedback radio node is adapted for being configured with a set of feedback codebooks, each codebook of the set indicating an arrangement of one or more subpatterns of feedback bits into feedback information. The feedback radio node further is adapted for transmitting feedback signaling representing feedback information determined based on a codebook selected from the set of feedback codebooks. The feedback radio node may comprise, and/or being adapted for utilising, processing circuitry and/or radio circuitry, in particular a transmitter and/or transceiver and/or receiver, for transmitting the feedback signaling and/or determining the feedback information and/or selecting the codebook. Alternatively, or additionally, the feedback radio node may comprise a transmitting module for the transmitting and/or a selecting module for the selecting and/or a determining module for the determining.

A feedback radio node may in particular be a user equipment or terminal. However, in some scenarios, e.g. backhaul or relay scenarios, a feedback radio node may be a network node, in particular a base station and/or gNodeB.

There is also disclosed a method of operating a signaling radio node and/or a signaling radio node arrangement in a radio access network. The method comprises configuring a feedback radio node with a set of feedback codebooks, each codebook of the set indicating an arrangement of one or more subpatterns of feedback bits into feedback information. Alternatively, or additionally, the method may comprise indicating and/or configuring, to a feedback radio node, a feedback codebook to be selected from a set of configured feedback codebooks for transmission of feedback signaling. Further alternatively, or additionally, the method may comprise receiving feedback signaling from a feedback radio node based on a feedback codebook selected from a set of feedback codebooks configured to the feedback radio node.

Also, signaling radio node and/or a signaling radio node arrangement for a radio access network may be considered, the signaling radio node and/or arrangement being adapted for configuring a feedback radio node with a set of feedback codebooks, each codebook indicating an arrangement of one or more subpatterns of feedback bits into feedback information. Alternatively, or additionally, the node and/or arrangement may be adapted for indicating and/or configuring, to a feedback radio node, a feedback codebook to be selected from a set of configured feedback codebooks for transmission of feedback signaling. Further alternatively, or additionally, the node and/or arrangement may be adapted for receiving feedback signaling from a feedback radio node based on a feedback codebook selected from a set of feedback codebooks configured to the feedback radio node. The signaling radio node and/or arrangement may comprise, and/or being adapted for utilising, processing circuitry and/ or radio circuitry, in particular one or more transmitters and/or transceivers and/or receivers, for configuring the feedback radio node and/or determining indicating or configuring the codebook to be selected and/or receiving the feedback signaling. Alternatively, or additionally, the signaling radio node and/or arrangement may comprise a configuring module for the configuring and/or an indicating module for the indicating and/or a receiving module for the receiving.

A signaling radio node may for example be a network node. However, in some scenarios, e.g. sidelink scenarios, the signaling radio node may be a user equipment or terminal. A signaling radio node arrangement may comprise one or more radio node, in particular network nodes, which may be of the same or different types. Different nodes of the arrangement may be adapted for, and/or provide, different functionalities described herein. In particular, different nodes may configure different codebooks, and/or different nodes may perform configuring and perceiving. A signaling radio node arrangement may in some variants represent a radio access network, and/or a heterogenous network (HetNet), and/or provide dual (or multiple) connectivity, e.g. comprising an anchor node and a booster node, and/or one or more of each or either. The radio nodes of a node arrangement may comprise suitable interfaces for communication between them, e.g. communication interfaces and/or corresponding circuitry.

Each subpattern of bits of a bit arrangement of feedback information may pertain to a specific data structure or substructure or message, in particular control message, or signaling or transmission. Alternatively, or additionally, a subpattern may be associated to a specific acknowledgement process identifier, e.g. HARQ process identifier or subprocess identifier.

A set of feedback codebooks may comprise a plurality of codebooks, in particular two or more, e.g. a multiple of two, in particular 4 or 8. Different codebooks may be different in at least one subpattern, and/or in at least one data structure or substructure or message or signaling or transmission a subpattern pertains to. Different codebooks may correspond to the same or different sizes, e.g. in terms of bit size of the feedback information (e.g., sum of bits of all subpatterns of the codebook), and/or number of subpatterns and/or number of bits in one or more subpatterns.

In general, the codebook may be selected based on one or more characteristics of control signaling received and/or subject transmission. Such characteristics may exemplarily pertain to carrier aggregation and/or activation status, and/or bandwidth part activated, and/or transmission mode and/or resources of the control signaling or subject transmission. The control signaling may be signaling scheduling the feedback signaling.

Receiving feedback signaling may comprise demodulating and/or decoding received signaling, and/or associating the bits of the signaling to subpatterns according to the selected codebook. It should be noted that the signaling radio node or arrangement receiving may be aware of the codebook selected, e.g. due to an indication transmitted by the feedback radio node, e.g. with the feedback signaling, e.g. in a message carrying the feedback signaling.

Transmitting feedback signaling may comprise transmitting a codebook indication indicating the codebook selected. Such an indication may be transmitted in a message carrying the feedback signaling, e.g. a control message carrying UCI or SCI. The message and/or indication may be transmitted on a channel and/or resources associated to control signaling, e.g. the feedback signaling, in particular a PUCCH or PSCCH or PUSCH (e.g., rate-matched or punctured). A transmission format may be associated to the signaling and/or channel. The codebook indication may be explicit, e.g. with a parameter and/or bit or bit field, and/or implicit, e.g. based on the resources and/or transmission format and/or channel used for transmitting the feedback signaling.

It may be considered that one or more of the feedback codebooks, or all codebooks of the set, may be HARQ codebooks. In some cases, one or more may be ARQ codebooks. A codebook may generally pertain to one carrier, or to more than one carriers, e.g. in a carrier aggregation; the carriers may be carriers for reception. In some variants, a codebook pertains to feedback signaling transmitted on one carrier, which may be an UL carrier or sidelink carrier of a carrier aggregation comprising a plurality of carriers in the other communication direction. It may be considered that a codebook pertains to transmission of feedback signaling at one instance or transmission timing, e.g. in one message, and/or according to a format for one transmission like short PUCCH or long PUCCH. The feedback information of the feedback signaling may be jointly encoded and/or modulated.

In some variants, the codebook may be selected based on an indication received with control information. The control information may be represented by control message, in particular a physical layer message and/or DCI message and/or SCI message. The control information may comprise the indication, and/or explicitly or implicitly indicate the codebook to be selected, e.g. based on carrier and/or resource (in particular, time and/or frequency or subcarrier/s) or resource structure, and/or CORESET, and/or search space, and/or resource pool or region or set in which the control message is received, and/or based on the type of the control message. The indication may in particular indicate and/or configure a resource pool and/or resources and/or a channel and/or transmission format for feedback control information and/or feedback signaling, e.g. corresponding to an uplink or sidelink control channel like PUCCH or PSCCH or other (e.g., physical) channel, e.g. a PUSCH. An indication of carrier and/or resource and/or channel may indirectly or implicitly indicate the codebook, e.g. based on a one-to-one mapping of resource or resource structure or channel to codebook. Such a mapping may be configured or configurable, e.g. with higher layer signaling like RRC signaling and/or MAC signaling, or may be predefined. Alternatively, or additionally, the indication may indicate a transmission to be received, and/or resources on which a transmission has to be received, and/or a channel of such a transmission, and/or a transmission format and/or type, e.g. slot-based or non-slot based transmission. The corresponding control message may be a scheduling assignment. An indication may additionally, or alternatively, indicate one or more carriers, which may be carriers on which subject transmission may be scheduled, and/or which may be configured and/or activated, e.g. in a carrier aggregation.

Generally, the codebook may be selected based on resources scheduled for transmission of the feedback signaling, e.g. in a resource structure and/or resource pool and/or region or set. The resources may be associated to a channel, in particular a physical and/or control channel, for example PUCCH or PSCCH. The resources may be scheduled with control signaling, e.g. a control message like a DCI or SCI message, which may in some variants implicitly or explicitly indicate the association to a channel and/or transmission format. Scheduling the resources may be considered an example of configuring. Scheduling resources may comprise indication resources from a set of resources, which may be configured and/or configurable, in particular with higher layer control signaling, like RRC signaling and/or MAC signaling.

Independent, or in combination with other criteria, it may be considered that the codebook is selected based on subject transmission characteristics, e.g. resources used for the subject transmission, and/or channel, and/or number of layers, e.g. in MIMO scenarios, and/or transport block size, and/or retransmission status (e.g., number of retransmission of the current transport block or code block group).

In general, the codebook may be selected based on a format indicated for the feedback signaling, e.g. a transmission format. The transmission format may be indicated implicitly or explicitly. For example, a transmission format may be associated to a channel and/or resources, which may be indicated by a mapping. The mapping may in some variants be configured or configurable, e.g. with higher layer control signaling like RRC and/or MAC signaling, and/or be predefined. The transmission format may be indicated, e.g. configured and/or scheduled, with control signaling, in particular a control message, which may be physical layer signaling, and/or a DCI or SCI message. A transmission format may for example define a structure of a message comprising and/or carrying the feedback information, e.g. in terms of header information and/or additional information and/or MCS and/or duration and/or maximum number of bits, etc. In general, a transmission format may pertain to a specific channel, e.g. a physical and/or control channel like PUCCH or PSCCH. A transmission format in some examples may represent short or long transmission, e.g. short or long PUCCH or PSCCH, and/or a transmission of 2 bits or less, or larger than 2 bits.

The feedback signaling may be based on a transmission codebook determined based on the selected codebook, for example by changing the selected codebook, in particular based on a received feedback control indication. The feedback control indication may be included in a control message, in particular a dynamic control message, for example a DCI or SCI message.

In general, a subpattern of bits of the feedback information may pertain to control signaling or data signaling (as examples of subject transmissions), and/or an associated message and/or data structure or substructure, in particular a control message or transport block or code block group.

At least one of the feedback codebooks of the set may comprise one or more subpatterns pertaining to control signaling, and/or a control message, and/or an associated data structure or substructure. The control message may in particular of command type.

Different feedback codebooks may pertain to different carriers and/or different carrier arrangements and/or different types of signaling and/or different types of control signaling and/or different types of data signaling. A type may be related to the message type, and/or channel and/or format and/or resources associated to the signaling. A control message type may be distinguished between fixed-size message (which may for example be fallback control messages) and messages with configurable size. The size may be measured in bits and/or modulation symbols.

At least one feedback codebook of the set may comprise at least one subpattern pertaining to a code block group. More than one subpattern of a codebook may pertain to (different) code block groups, and/or more than one codebooks may comprise one or more of such subpatterns.

There is also disclosed a program product comprising instructions adapted for causing processing circuitry to control and/or perform a method as described herein.

Moreover, a carrier medium arrangement carrying and/or storing a program product as described herein may be considered.

The approaches described herein allow flexible use of feedback with limited signaling overhead. In particular, it is possible to use implicit signaling, or already existing signaling like a resource or channel indication in control signaling to indicate which codebook to select. The configuring of the set of codebooks may be performed with higher layer signaling. Accordingly, signaling overhead on dynamic signaling and total signaling may be limited. This may be particularly advantageous in scenarios in which code block group-level feedback may be desired, but fallback functionality or low latency functionality provided transport block-level feedback. In such cases, different codebooks may be provided, which may be selected based on the type of control signaling used for scheduling. Also, suitably codebook sizes may be configured, avoiding unnecessary large feedback transmissions, e.g. by reducing or avoiding padding.

Feedback signaling may generally pertain to subject transmission. Subject transmission may be data signaling or control signaling. The transmission may be on a shared or dedicated channel. Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. In some cases, the subject transmission may comprise, or represent, reference signaling. For example, it may comprise DM-RS and/or pilot signaling and/or discovery signaling and/or sounding signaling and/or phase tracking signaling and/or cell-specific reference signaling and/or user-specific signaling, in particular CSI-RS. Feedback based on reference signaling may comprise measurement information, e.g. CQI/CSI information and/or related information.

A feedback configuration may configure a HARQ codebook. A feedback codebook may in general be configured dynamically and/or semi-statically. Performing re-transmission may comprise transmitting the control information again, if it was not received correctly, e.g., according to the feedback. Such re-transmission may use a different transmission format or mode and/or MCS and/or error encoding than an earlier transmission. The number of transmission of specific control information may be counted, and in some cases, may be limited in number by a threshold, which may be predefined and/or configured or configurable. If the threshold is reached, retransmission may be stopped. It may be considered that performing retransmission comprises transmitting new control information and/or omitting retransmission of control information if correct reception is indicated by the feedback. A signaling radio node and/or arrangement may generally be adapted for performing re-transmission based on received feedback signaling, and/or perform such re-transmission.

Acknowledgement feedback may be transmitted based on a feedback codebook, e.g. a HARQ codebook. A codebook may indicate which bit/s of feedback pertain to which transmission and/or information and/or data structure (e.g., transport block or code block or code block group and/or message and/or signaling or transmission), e.g. indicating acknowledgment or non-acknowledgement, or non-transmission/reception.

It may be considered that transmitting the feedback signaling, in particular of acknowledgement feedback, is based on determining whether the subject transmission has been received correctly, e.g. based on error coding and/or reception quality. Reception quality may for example be based on a determined signal quality.

In some variants, a feedback configuration, and/or control information configuring it, may comprise a position indication indicating a position of the acknowledgement feedback relative to second acknowledgement feedback and/or in a feedback or HARQ codebook. The second acknowledgement feedback and/or an associated second resource may be indicated in a control message, e.g. the control message carrying the control information. The position indication may comprise an indicator like a downlink assignment indicator or index (DAI), which may indicate or count a number of data structures (like transport blocks and/or code blocks and/or code block groups and/or messages and/or control/command messages) for which acknowledgement feedback is scheduled and/or indicated, e.g. control feedback and/or other acknowledgement feedback. Different control messages, e.g. scheduling assignments, may comprise differently valued indicators, e.g. representing counts. A control message may optionally comprise a total number indicator, which may indicate a total number of data structures for which feedback is scheduled and/or indicated. Such an indicator may be referred to as total DAI. Alternatively, or additionally, a position indication and/or the indicator may indicate a count of bits scheduled and/or indicated for feedback, or a total number of bits, respectively. A count may pertain to a HARQ codebook, for example indicating where in the HARQ codebook a bit subpattern representing the feedback information for a data structure is to be located. It may be considered that for different types of data structures and/or channels and/or resource pools, different codebooks may be used. Feedback that is combined may be based on the same codebook. In some variants, a subpattern combination pertaining to control information may also pertain to data signaling, e.g. data signaling scheduled for reception, which may be scheduled by the control message carrying the control information. In such a case, there may be only one indicator, e.g. indicating one count, based on which the target radio node may include the subpattern in the codebook. The subpattern combination may comprise a subpattern indicating reception of the control information and a subpattern indicating reception of the data signaling, e.g., in a predefined or configured or configurable order. For example, the subpattern combination may comprise two bits, wherein one bit may indicate ACK/NACK for the control information, and the other ACK/NACK for the data signaling. Other orders, or different subpatterns may be considered. Subject transmission may in general comprise one or more messages, in particular one or more control messages, and/or one or more transmissions, e.g. pertaining to one or more channels, e.g. a data channel and/or a control channel. Such transmissions may be distributed over time, e.g. in different slots and/or mini-slots.

A system comprising a plurality of radio nodes as described herein, in particular a network node and one or more user equipments may be considered.

Acknowledgement or feedback information may represent and/or comprise one or more bits, in particular a pattern of bits. Multiple bits pertaining to a data structure or substructure or message like a control message may be considered a subpattern. The structure or arrangement of feedback or acknowledgement information may indicate the order, and/or meaning, and/or mapping, and/or pattern of bits (or subpatterns of bits) of the information. An acknowledgment configuration, in particular the feedback configuration, may indicate the size of, and/or arrangement and/or mapping of bits of, acknowledgement information carried by the acknowledgement signaling the configuration pertains to. Such a configuration may be referred to as codebook. The structure or mapping may in particular indicate one or more data block structures, e.g. code blocks and/or code block groups and/or transport blocks and/or messages, e.g. command messages, the acknowledgement information pertains to, and/or which bits or subpattern of bits are associated to which data block structure. In some cases, the mapping may pertain to one or more acknowledgement signaling processes, e.g. processes with different identifiers, and/or one or more different data streams. The configuration may indicate to which process/es and/or data stream/s the information pertains. Generally, the acknowledgement information may comprise one or more subpatterns, each of which may pertain to a data block structure, e.g. a code block or code block group or transport block. A subpattern may be arranged to indicate acknowledgement or non-acknowledgement, or another retransmission state like non-scheduling or non-reception, of the associated data block structure. It may be considered that a subpattern comprises one bit, or in some cases more than one bit. It should be noted that acknowledgement information may be subjected to significant processing before being transmitted with acknowledgement signaling. Different configurations may indicate different sizes and/or mapping and/or structures and/or pattern.

A transmission format may generally indicate one or more data block structures or substructures for transmission or reception, and/or how a data block like a transport block (and/or a related structure) is divided, e.g. into subblocks or subblock groups, like code block/s and/or code block group/s. A transmission format may in some cases pertain to more than one data block, and/or may pertain to more than one acknowledgement signaling process. It may be considered that a transmission format indicates size in bits and/or coding for the one or more data block structures or substructures. A transmission format may pertain to signaling to be transmitted by a radio node, or to signaling to be received, and/or to acknowledgement signaling pertaining to signaling to be received. For different communication directions, and/or different carriers and/or bandwidth parts, and/or sets thereof, and/or different configurations, in particular different configurations of the set of acknowledgement configurations, different transmissions formats may be utilised, e.g. defined and/or configured. In particular, a transmission format for transmission on the transmission resources may be different from a transmission format associated to an acknowledgement configuration like the feedback configuration. Transmission formats may be independently configured from each other, e.g. using different messages and/or different signaling, e.g. on different layers of the protocol stack.

A feedback configuration, in particular a feedback codebook, may generally be a code block group configuration, which may indicate a mapping of one or more acknowledgement information subpatterns (e.g., one or more bits) to one or more code block groups, each of which may comprise or consist of the same or a different number of code blocks, in particular one or more code blocks. Each subpattern may be mapped to one code block group. In some variants, an acknowledgement configuration may indicate a mapping of one or more subpatterns to one or more transport blocks, each of which may comprise and/or consist of one or more code block groups. Each subpattern may be mapped to one transport block. An acknowledgement configuration may pertain to a combination of code block group/s and transport block/s, in particular regarding the structure or transmission format of corresponding acknowledgement information. An acknowledgement configuration may be considered to configure and/or format feedback or acknowledgement information pertaining to code block groups or transport blocks or code blocks.

A data block structure may correspond to a scheduled data block, e.g. for data signaling. The data blocks may be associated to separately scheduled transmissions, e.g. separate channels and/or instances and/or carriers and/or component carriers and/or data streams, e.g. in the context of carrier aggregation and/or multiple-antenna transmissions, e.g. MIMO (Multiple-Input, Multiple-Output). The data blocks and/or associated data signaling may be for downlink, or in some cases for sidelink. The feedback signaling, in particular acknowledgement signaling, may generally be uplink signaling, but in some variants may be sidelink signaling. However, there may be considered cases in which data signaling is uplink signaling, e.g. in the context of retransmission performed by a user equipment. A subpattern may represent the acknowledgement information and/or feedback for the associated data block, e.g. with the size as indicated by an assignment indication. Different data blocks may be associated to different transmission instances and/or different acknowledgment signaling processes, e.g. HARQ processes. An acknowledgement signaling procedure may comprise one or more acknowledgement signaling processes, which may pertain to the same communication direction.

A data block structure (or, shorter, data structure) may generally represent, and/or be associated to, a scheduled data block and/or corresponding signaling. The data block may be scheduled for reception, e.g. by control signaling, in particular a control information message, which may be a scheduling assignment. In some cases, a scheduled data block may not be received, which may be reflected in the corresponding acknowledgement signaling. A number of data block structures, and/or the number of assignment indications, may be considered to represent a number of transmissions of data scheduled to be received by the user equipment (or second radio node).

A data block structure may generally represent, and/or correspond to, a data block, which may generally be a block of data and/or bits. A data block may for example be a transport block, code block, or code block group. It may be considered that a data block structure represents a data block which may be intended to be subjected to an acknowledgement signaling process. A data block may comprise one or more subblocks, which may be grouped into one or more subblock groups, e.g. code block groups. A data block may in particular be a transport block, which may comprise one or more code blocks and/or one or more code block groups. A data block structure may be considered to accordingly represent a transport block, code block or code block group. A subblock group like a code block group may comprise one or more subblocks, e.g. code blocks. It may be considered that a data block comprises one or more subblock groups, which may have the same or different sizes (e.g., in number of bits, e.g. systemic and/or coding bits). It may be considered that a data block comprises information bits or systematic bits (which may be considered to represent data to be transmitted and/or error detection bits) and/or coding bits, e.g. bits for error coding like error detection and/or in particular error correction coding, and/or parity or CRC (Cyclic Redundancy Check) bits. A subblock (e.g., code block) and/or subblock group (e.g., code block group) may analogously comprise systemic and/or coding bits. In some cases, systematic bits may be considered to comprise information and error detection bits determined based on the information bits. Parity bits may be considered to represent error correction coding bits. It should be noted that for a data structure (like a transport block) comprising one or more substructures (e.g., CBGs or code blocks), the systematic bits, and possibly parity bits, of the substructures may be considered information bits, based on which error detection coding and/or correction coding may be performed.

An acknowledgment signaling process may be a HARQ process, and/or be identified by a process identifier, e.g. a HARQ process identifier or subidentifier. Acknowledgement signaling and/or associated acknowledgement information may be referred to as feedback. It should be noted that data blocks or structures to which subpatterns may pertain may be intended to carry data (e.g., information and/or systemic and/or coding bits). However, depending on transmission conditions, such data may be received or not received (or not received correctly), which may be indicated correspondingly in the feedback. In some cases, a subpattern of acknowledgement signaling may comprise padding bits, e.g. if the acknowledgement information for a data block requires fewer bits than indicated as size of the subpattern. Such may for example happen if the size is indicated by a unit size larger than required for the feedback.

Acknowledgment information may generally indicate at least ACK or NACK, e.g. pertaining to an acknowledgment signaling process, or an element of a data block structure like a data block, subblock group or subblock, or a message, in particular a control message. Generally, to an acknowledgment signaling process there may be associated one specific subpattern and/or a data block structure, for which acknowledgment information may be provided.

An acknowledgment signaling process may determine correct or incorrect reception, and/or corresponding acknowledgement information, of a data block like a transport block, and/or substructures thereof, based on coding bits associated to the data block, and/or based on coding bits associated to one or more data block and/or subblocks and/or subblock group/s. Acknowledgement information (determined by an acknowledgement signaling process) may pertain to the data block as a whole, and/or to one or more subblocks or subblock groups. A code block may be considered an example of a subblock, whereas a code block group may be considered an example of a subblock group. Accordingly, the associated subpattern may comprise one or more bits indicating reception status or feedback of the data block, and/or one or more bits indicating reception status or feedback of one or more subblocks or subblock groups. Each subpattern or bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g. subblock/subblock group/data block) the subpattern provides acknowledgement information for and/or is associated to may be considered its (highest) resolution. In some variants, a subpattern may provide acknowledgment information regarding several elements of a data block structure and/or at different resolution, e.g. to allow more specific error detection. For example, even if a subpattern indicates acknowledgment signaling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subblock and/or subblock group may comprise information bits (representing the data to be transmitted, e.g. user data and/or downlink/sidelink data or uplink data). It may be considered that a data block and/or subblock and/or subblock group also comprises error one or more error detection bits, which may pertain to, and/or be determined based on, the information bits (for a subblock group, the error detection bit/s may be determined based on the information bits and/or error detection bits and/or error correction bits of the subblock/s of the subblock group). A data block or substructure like subblock or subblock group may comprise error correction bits, which may in particular be determined based on the information bits and error detection bits of the block or substructure, e.g. utilising an error correction coding scheme, e.g. LDPC or polar coding. Generally, the error correction coding of a data block structure (and/or associated bits) may cover and/or pertain to information bits and error detection bits of the structure. A subblock group may represent a combination of one or more code blocks, respectively the corresponding bits. A data block may represent a code block or code block group, or a combination of more than one code block groups. A transport block may be split up in code blocks and/or code block groups, for example based on the bit size of the information bits of a higher layer data structure provided for error coding and/or size requirements or preferences for error coding, in particular error correction coding. Such a higher layer data structure is sometimes also referred to as transport block, which in this context represents information bits without the error coding bits described herein, although higher layer error handling information may be included, e.g. for an internet protocol like TCP. However, such error handling information represents information bits in the context of this disclosure, as the acknowledgement signaling procedures described treat it accordingly.

In some variants, a subblock like a code block may comprise error correction bits, which may be determined based on the information bit/s and/or error detection bit/s of the subblock. An error correction coding scheme may be used for determining the error correction bits, e.g. based on LDPC or polar coding. In some cases, a subblock or code block may be considered to be defined as a block or pattern of bits comprising information bits, error detection bit/s determined based on the information bits, and error correction bit/s determined based on the information bits and/or error detection bit/s. It may be considered that in a subblock, e.g. code block, the information bits (and possibly the error correction bit/s) are protected and/or covered by the error correction scheme or corresponding error correction bit/s. A code block group may comprise one or more code blocks. In some variants, no additional error detection bits and/or error correction bits are applied, however, it may be considered to apply either or both. A transport block may comprise one or more code block groups. It may be considered that no additional error detection bits and/or error correction bits are applied to a transport block, however, it may be considered to apply either or both. In some specific variants, the code block group/s comprise no additional layers of error detection or correction coding, and the transport block may comprise only additional error detection coding bits, but no additional error correction coding. This may particularly be true if the transport block size is larger than the code block size and/or the maximum size for error correction coding. A subpattern of acknowledgement signaling (in particular indicating ACK or NACK) may pertain to a code block, e.g. indicating whether the code block has been correctly received. It may be considered that a subpattern pertains to a subgroup like a code block group or a data block like a transport block. In such cases, it may indicate ACK, if all subblocks or code blocks of the group or data/transport block are received correctly (e.g. based on a logical AND operation), and NACK or another state of non-correct reception if at least one subblock or code block has not been correctly received. It should be noted that a code block may be considered to be correctly received not only if it actually has been correctly received, but also if it can be correctly reconstructed based on soft-combining and/or the error correction coding.

A subpattern may pertain to one acknowledgement signaling process and/or one carrier like a component carrier and/or data block structure or data block. It may in particular be considered that one (e.g. specific and/or single) subpattern pertains, e.g. is mapped by the codebook, to one (e.g., specific and/or single) acknowledgement signaling process, e.g. a specific and/or single HARQ process. It may be considered that in the bit pattern, subpatterns are mapped to acknowledgement signaling processes and/or data blocks or data block structures on a one-to-one basis. In some variants, there may be multiple subpatterns (and/or associated acknowledgment signaling processes) associated to the same component carrier, e.g. if multiple data streams transmitted on the carrier are subject to acknowledgement signaling processes. A subpattern may comprise one or more bits, the number of which may be considered to represent its size or bit size. Different bit n-tupels (n being 1 or larger) of a subpattern may be associated to different elements of a data block structure (e.g., data block or subblock or subblock group), and/or represent different resolutions. There may be considered variants in which only one resolution is represented by a bit pattern, e.g. a data block. A bit n-tupel may represent acknowledgement information (also referred to a feedback), in particular ACK or NACK, and optionally, (if n>1), may represent DTX/DRX or other reception states. ACK/NACK may be represented by one bit, or by more than one bit, e.g. to improve disambiguity of bit sequences representing ACK or NACK, and/or to improve transmission reliability.

Generally, the feedback signaling, in particular acknowledgement signaling may be signaling at one instance and/or in one transmission timing structure, and/or scheduled for common transmission and/or the acknowledgement information may be jointly encoded and/or modulated. The acknowledgement information or feedback information may pertain to a plurality of different transmissions, which may be associated to and/or represented by data block structures, respectively the associated data blocks or data signaling. The data block structures, and/or the corresponding blocks and/or signaling, may be scheduled for simultaneous transmission, e.g. for the same transmission timing structure, in particular within the same slot or subframe, and/or on the same symbol/s. However, alternatives with scheduling for non-simultaneous transmission may be considered. For example, the acknowledgment information may pertain to data blocks scheduled for different transmission timing structures, e.g. different slots (or mini-slots, or slots and mini-slots) or similar, which may correspondingly be received (or not or wrongly received). Scheduling signaling may generally comprise indicating resources, e.g. time and/or frequency resources, for example for receiving or transmitting the scheduled signaling.

A radio node, in particular a signaling radio node, may generally be adapted for scheduling data blocks or subject transmission for transmission and/or to provide and/or determine and/or configure associated assignment indications, which may include a total assignment indication. Configuring a feedback radio node or an UE may comprise such scheduling and/or associated determining and/or configuring and/or providing of the assignment indications.

A resource structure may represent time and/or frequency and/or code resources. In particular, a resource structure may comprise a plurality of resource elements, and/or one or more resource blocks/PRBs.

Signaling may be considered to carry a message and/or information, if the message and/or information is represented in the (modulated) waveform of the signaling. In particular, extraction of a message and/or information may require demodulation and/or decoding of the signaling. Information may be considered to be included in a message if the message comprises a value and/or parameter and/or bit field and/or indication or indicator representing the information, or more than one or a combination thereof. Information included in such a message may be considered to be carried by the signaling carrying the message, and vice versa. A signaling characteristic, however, may pertain to a characteristic accessible without demodulation and/or decoding, and/or may be determined or determinable independent thereof. However, in some cases it may be considered that signaling is demodulated and/or decoded to determine whether the characteristic is associated to specific signaling, e.g. if the resources characterising the signaling actually belong to control signaling and/or to signaling intended for the responding radio node or user equipment. Also, in some cases, the characteristic may be provided as information in a message, in particular if the characterising signaling is not carrying the selection control message. Generally, selection of the resource structure may be based on one or more than one signaling characteristics. A signaling characteristic may in particular represent one or more resources, in particular in time domain, e.g. beginning and/or end and/or duration of the signaling, e.g., represented in symbol/s, and/or frequency range or resources of the signaling, e.g. represented in subcarrier/s, and/or numerology of the signaling, in particular of control signaling or data signaling like PDSCH signaling or PSSCH signaling. In some cases, the characteristic may indicate a message format, e.g. a format of the selection control message, for example an associated DCI or SCI format. It may generally be considered that a signaling characteristic represents and/or indicates a DCI format and/or search space (e.g., reception pool) and/or code, e.g. scrambling code, and/or an identity, e.g. one of different identities (like R-NTI or C-NTIs) assigned to the responding radio node or user equipment. Control signaling may be scrambled based on such identity.

Transmitting acknowledgment information/feedback on resources may comprise multiplexing acknowledgement information and data/data signaling on the transmission resources, e.g., for UCI on PUSCH scenarios. In general, transmitting acknowledgement information and/or feedback may comprise mapping the information to the transmission resources and/or modulation symbol/s, e.g. based on a modulation and coding scheme and/or transmission format. The acknowledgement information may be punctured or rate-matched. Acknowledgement information pertaining to different subject transmissions and/or acknowledgment signaling processes may be mapped differently. For example, acknowledgement information pertaining to late subject transmissions and/or having a size smaller than a threshold size (e.g., 3 or 2 bits) may be punctured, whereas acknowledgment information pertaining to earlier (non-late) subject transmissions and/or having a size equal to or larger than the threshold size may be rate-matched.

Feedback signaling, e.g. acknowledgement feedback, may generally be transmitted on resources and/or on a channel and/or according to a transmission format according to one or more configurations, which may for example be selectable based on one or more indications of control information, e.g. of the control message carrying the control information.

BRIEF DESCRIPTION OF THE DRAWINGS

The drawings are provided to illustrate concepts and approaches described herein, and are not intended to limit their scope. The drawings comprise.

DETAILED DESCRIPTION

In the following, approaches are described for illustrative purposes in the context of NR RAT. However, they are generally applicable with other technologies. Also, communication in uplink and downlink between a signaling radio node like a network node and a feedback radio node like an UE is described by way of example. The approaches should not be construed to be limited to such communication, but can also be applied for sidelink or backhaul or relay communication. For ease of reference, in some cases it is referred to a channel to represent signaling or transmission on the channel. A PUSCH may represent uplink data signaling, a PDSCH downlink data signaling, a PDCCH downlink control signaling (in particular, one or more DCI messages like scheduling assignments or grants), a PUCCH uplink control signaling, in particular signaling of UCI. In some cases, UCI may be transmitted on PUSCH or associated resource instead of on PUCCH.

A carrier may be portioned into bandwidth parts (BWP). Bandwidth parts can have multiple usages. One of the envisioned usage scenarios is to enable multiple numerologies mixed in frequency-domain on the same carrier. A BWP configuration may indicate a set of frequency-domain resources, and an associate numerology. A UE can be configured with one or multiple BWP parts. DL and UL configurations (and/or SL configurations) may be are independent from each other. Typically, each BWP has its own associated CORESET for the scheduling DCI.

In general, (acknowledgement) feedback may be considered to pertain to information or signaling or a message if is determined based on evaluating error coding included into the information and/or calculated for the information, and/or if it is adapted to indicate a reception status of the information or signaling or message, e.g. acknowledgement or non-acknowledgement; and/or if it based on measurements performed on the signaling.

Figure 1:
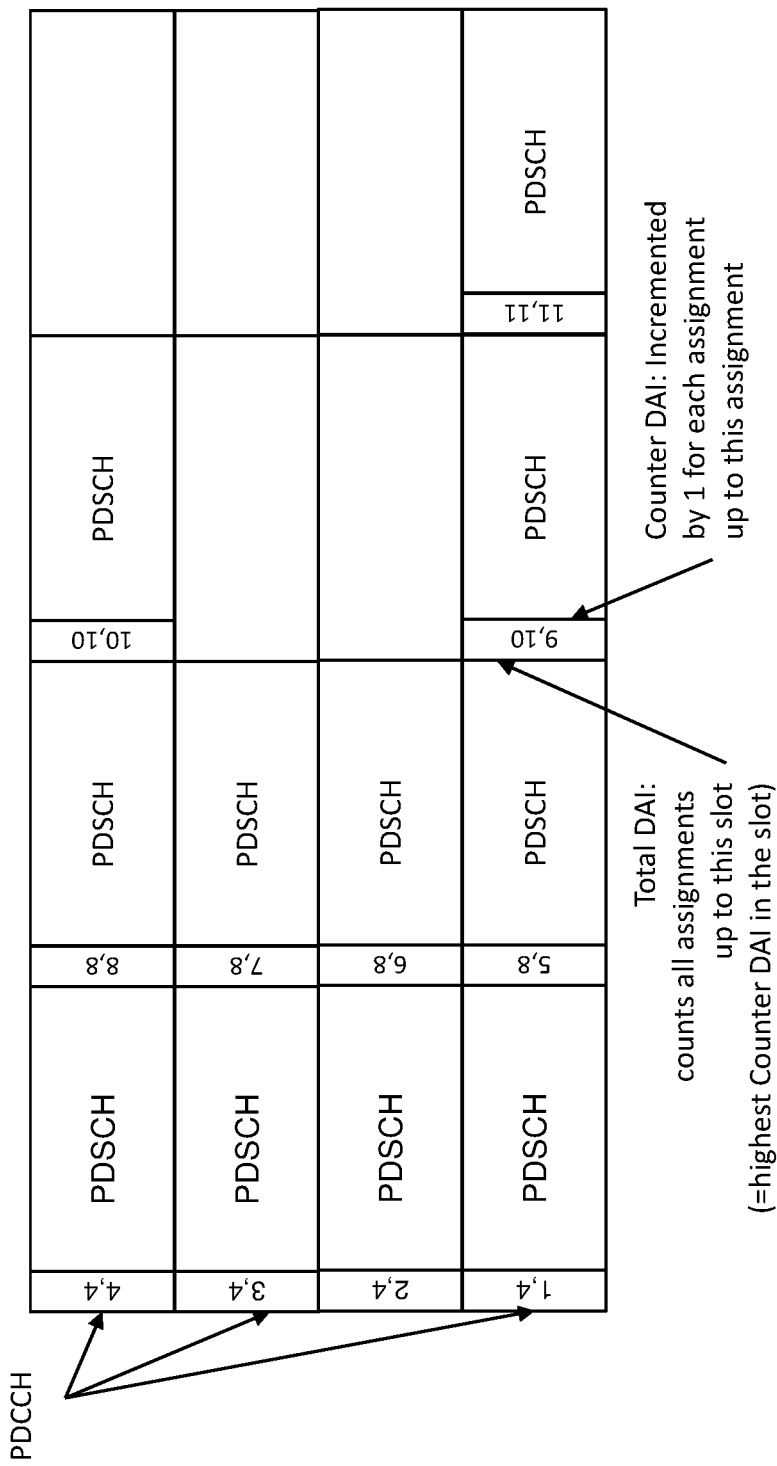
FIG. 1, showing an exemplary downlink signaling structure.

FIG. 1 schematically shows an exemplary signaling structure of a dynamic HARQ codebook (in both component carrier and time dimension). Here, each DL assignment (typically a DL assignment is carried in a DCI on PDCCH) contains a counter and total DAI field. The counter DAI field counts the number of DL assignments that has been scheduled so far (including the current DL assignment) for the current HARQ codebook. The component carriers are ordered (e.g. according to carrier frequency) and the counter DAI counts DL assignments in this order. Along the time axis the counter DAI is not reset but is increased continuously at slot boundaries. The total DAI in each DL assignment is set to the total number of DL assignments that have been scheduled so far (including the current slot) for the current HARQ codebook. The total DAI in a slot is thus set to the highest counter DAI of the slot. To save overhead, a modulo operation (often mod 2) may be applied to counter and total DAI which can then be expressed with a few bits, e.g. 2 bit for mod-2. The counter/total DAI mechanism enables the receiver to recover the HARQ codebook size as well as indexing into the HARQ codebook if few contiguous DL assignments are missed.

PUCCH can carry UCI, e.g. ACK/NACK (or more generally, feedback related to HARQ), measurement information like CQI/CSI, SR, or beam related information.

NR defines a variety of different PUCCH formats, which can be grouped into short and long PUCCH formats.

Short PUCCH

Short PUCCH comes in flavors for =2 bit and >2 bit. Short PUCCH can be configured at any symbols within a slot. While for slot-based transmissions short PUCCH towards the end of a slot interval is the typical configuration, PUCCH resources distributed over or early within a slot interval can be used for scheduling request or PUCCH signaling in response to mini-slots.

PUCCH for =2 bit uses sequence selection. In sequence selection the input bit(s) selects one of the available sequences and the input information is presented by the selected sequence; e.g. for 1 bit 2 sequences are required, for 2 bit 4 sequences. This PUCCH can either span 1 or 2 symbols, in case of 2 symbols the same information is transmitted in a second symbol, potentially with another set of sequences (sequence hopping to randomize interference) and at another frequency (to achieve frequency-diversity).

PUCCH for >2 bit uses 1 or 2 symbols. In case of 1 symbol, DM-RS and UCI payload carrying subcarriers are interleaved. The UCI payload is prior mapping to subcarriers encoded (either using Reed Muller codes or Polar codes, depending on the payload). In case of 2 symbols, the encoded UCI payload is mapped to both symbols. For the 2-symbol PUCCH, typically the code rate is halved (in two symbols twice as many coded bits are available) and the second symbol is transmitted at a different frequency (to achieve frequency-diversity).

Long PUCCH

Long PUCCH corns in the two flavors=2 bit and >2 bit. Both variants exist with variable length ranging from 4 to 14 symbols in a slot, and can be aggregated across multiple slots. Long PUCCH can occur at multiple positions within a slot with more or less possible placements depending on the PUCCH length. Long PUCCH can be configured with or without frequency-hopping.

Long PUCCH for >2 bit uses TDM between DM-RS and UCI-carrying symbols. UCI payload is encoded (either using Reed Muller codes or Polar codes, depending on the payload), mapped to modulation symbols (typically QPSK or pi/2 BPSK), DFT-precoded to reduce PAPR, and mapped to allocated subcarriers for OFDM transmission.

Figure 2:
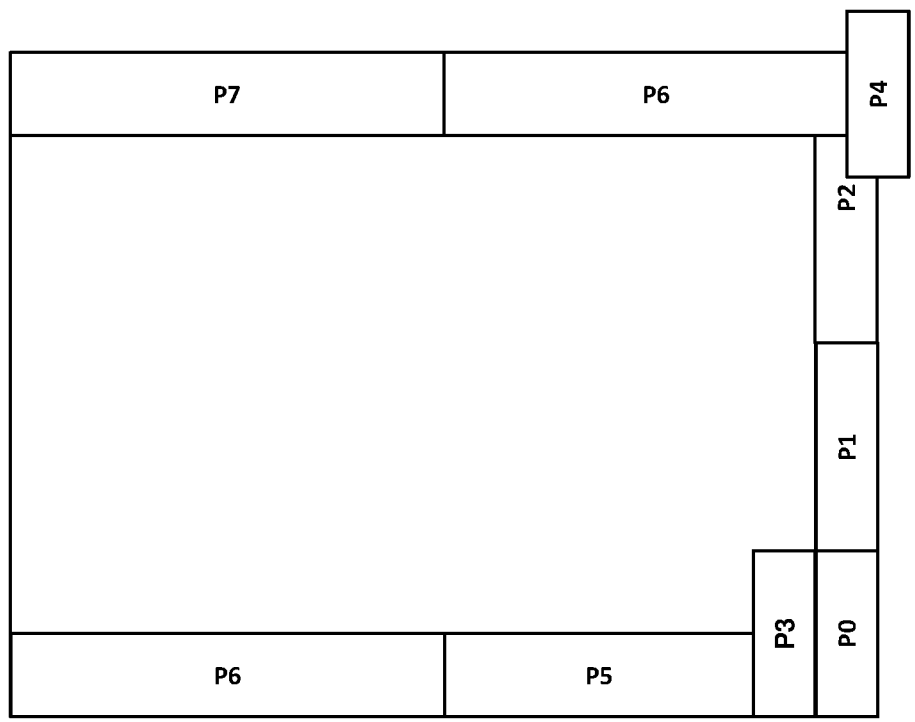
FIG. 2, showing exemplary resources for PUCCH.

A UE can be configured with multiple PUCCH formats, of the same or different type. Small payload PUCCH formats are needed if a UE is scheduled only with 1 or 2 DL assignments while a large payload format is needed if the UE is scheduled with multiple DL assignments. Long PUCCH formats are also needed for better coverage. A UE could for example be configured with a short PUCCH for =2 bit and a long PUCCH for >2 bit. A UE in very good coverage could even use a short PUCCH format for >2 bit while a UE in less good coverage requires even for =2 bit a long PUCCH format. FIG. 2 depicts an example of PUCCH formats configured to a UE. P0 to P4 correspond to different PUCCH resources for short PUCCH, P5 to P8 to PUCCH resources for long PUCCH. Between the PUCCH resources, signaling on PUSCH or other signaling, or no signaling may be scheduled. Resources may overlap, as indicated with P4. Depending on which resource is indicate for PUCCH transmission and/or the feedback signaling, a codebook may be selected for transmission.

NR supports dynamic indication of PUCCH resource and time. A HARQ codebook carried by PUCCH can contain HARQ feedback from multiple subject transmissions, e.g. PDSCH (from multiple time instances and/or component carriers) and/or one or more PDCCH. The PUCCH resource and time may be indicated in the scheduling DL assignment in case of a dynamic scheduled subject transmission representing data signaling. The association between PDSCH and PUCCH can be based on the PUCCH resource (PR) and time indicated in the scheduling DCI ($\Delta T$). It may be considered that feedback like HARQ feedback for subject transmissions like PDSCHs (data signaling) and/or control signaling, which is scheduled for transmission on the same resource and/or time, may be reported together based on the same codebook. The codebook may e.g. be selected based on the resource and/or time and/or channel of transmission, and/or of reception and/or type of subject transmission/s.

Figure 3:
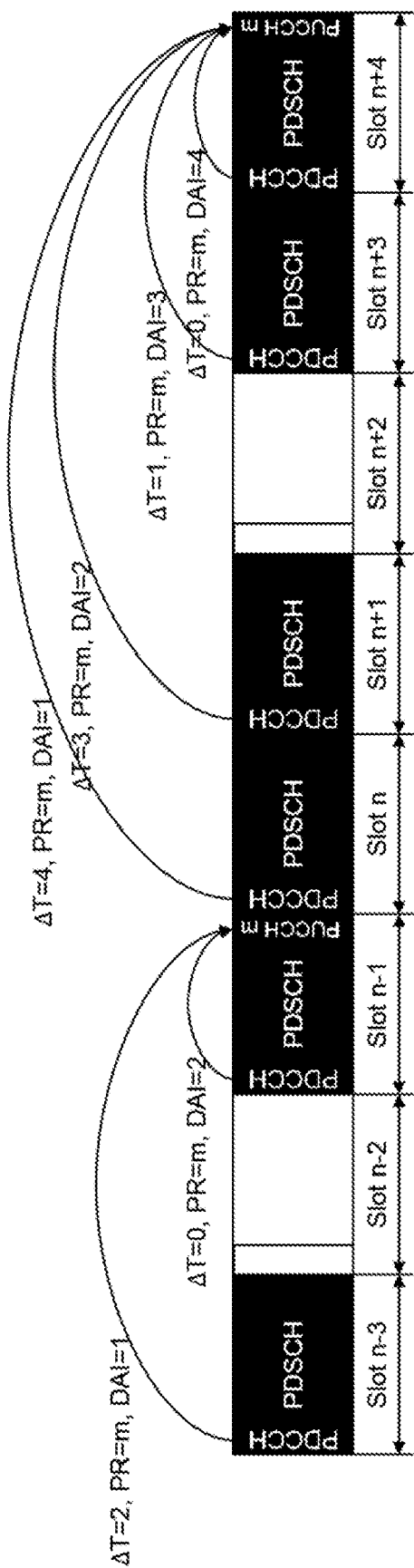
FIG. 3, showing an exemplary signaling structure.

The latest PDSCH that can be included is limited by the processing time the UE needs to prepare HARQ feedback. In the example in FIG. 3, the UE can report HARQ feedback on a short PUCCH in the same slot. The earliest PDSCH to include in the HARQ codebook for a given PUCCH resource is the first scheduled PDSCH after the time window of the last transmitted same PUCCH resource has been expired. In FIG. 3, PDSCH of slot n−1 is reported on PUCCH resource m of slot n−1; PDSCH from slot n is therefore the first PDSCH to include in the HARQ codebook transmitted on PUCCH resource m in slot n+4.

To avoid wrong HARQ codebook sizes and wrong indexing into the HARQ codebook, a DAI may be included in each DL assignment that counts DL assignments up to (including) the current DL assignment. A counter and a total DAI may be provided, for example for a case of carrier aggregation. In FIG. 3, the case without carrier aggregation is shown.

In NR, a carrier can support slot-based transmissions and non-slot-based transmissions (mini-slots). For slot-based transmissions, UE might be configured with CBG. For non-slot-based transmission a CBG configuration might be less useful, especially if the transmissions are short (one or few code blocks). Also, if a UE is scheduled with fallback DCI, it may in some cases not use a CBG configuration. If a UE is scheduled with a non-slot-based transmission (e.g., to provide low latency), the gNB is likely to request early HARQ feedback to determine if a transmission has been successful. This can be done by indicating a different PUCCH resource than that one used for other ongoing transmissions. In such cases, a set of feedback configurations to select from may be advantageous.

It is suggested configuring a UE with multiple (at least two) HARQ codebook configurations, respectively multiple codebooks. The multiple HARQ codebook configurations can be any combinations of dynamic and semi-statically configured HARQ codebook, e.g. if a UE is configured with two HARQ codebooks, both could be dynamic, both could be semi-statically configured, or one could be dynamic and the other could be semi-statically configured, or any one could be partly semi-statically and partly dynamically configured. Based on implicit or explicit information available at the UE, the UE determines which HARQ codebook configuration to use (selects a codebook), and uses the determined HARQ codebook configuration for HARQ feedback transmission on PUCCH or as UCI on PUSCH.

Accordingly, unnecessarily large HARQ feedback transmissions may be avoided, which may reduce interference, and/or UE battery power consumption, and fewer radio resources may be utilised.

A UE may be configured with multiple HARQ codebook configurations. A HARQ codebook configuration (or short, codebook) may be defined by one or several configuration parameters. Examples of such parameters comprise dynamic/semi-statically configured, HARQ codebook size, number of component carriers, time window length, number of HARQ processes in the HARQ codebook, MIMO configuration (e.g., how many transport blocks a PDSCH can contain at most, of at least one component carrier or the highest number across configured component carriers), CBG configuration (e.g., how many CBG a transport block can contain at most, of at least one component carrier or the highest number across configured component carriers), fixed size of each entry in the HARQ codebook, presence/absence and size of DAI or slot counters, subpattern arrangement or size. Different codebooks may differ in at least one of such parameters.

Which HARQ codebook configuration to use may be selected based on explicit or implicit information available at the UE. Examples of implicit and explicit information are provided in the following.

Indication in DCI (control message) is discussed in the following. The HARQ codebook configuration to use may be (explicitly) indicated in the DCI, e.g. one bit could be added to the DCI to select between two configured HARQ configuration.

The presence or absence of certain fields in the DCI can be used to select between HARQ codebook configurations. Also, DCI size or type (e.g. regular DCI vs. fallback DCI type) can be used to select between two or multiple HARQ codebook configuration.

The information can also be implicitly derived from the resources, e.g. time-domain resource allocation. For certain time-domain resource allocations, fulfilling a predefined criterium (e.g. scheduled duration below a configured/fixed threshold) may determine which HARQ codebook configuration to use (e.g., for a set of two HARQ codebooks configurations, but could be extended to multiple HARQ codebook configurations with multiple thresholds). This enables using a small HARQ codebook for short transmissions, while a more complex one may be used for other transmissions.

A similar criterion can be based on the transport block size. If e.g. the transport block size is below a threshold (alternatively, the number of code blocks or code block groups is below a threshold) a different HARQ codebook configuration may be used than for a transport block size reaching or over the threshold.

If the UE operates with a dynamic HARQ codebook configuration, the scheduling DCI may contain a DAI to avoid errors due to missed DL assignments. The DAI size may for example be 2 or 3 bit. One or a few DAI combinations (codepoints) can be used to select the HARQ codebook configuration. It may be considered to reserve certain combinations for other bit fields to indicate another HARQ codebook; such bit field combinations may be unused or unassigned for other functionality of the bit field.

Selection based on CORESET/search space/RNTI may be considered.

The determination which HARQ codebook configuration to use can also be based on the CORESET and/or search space which has been used to schedule the DL transmission. Typical MBB (Mobile BroadBand) transmissions are slot-based, while for low latency application, non-slot-based transmissions may be used. MBB transmissions are therefore typically scheduled from a CORESET at the beginning of a slot, while low latency transmissions can be scheduled more flexible. CORESETS and/or search spaces can be—via configuration—be associated with a HARQ codebook configuration of a set. Note that multiple CORESET/search spaces can point to the same HARQ codebook configuration.

A UE may be configured with multiple Radio Network Temporary Identifiers (RNTI). The CRC of a DCI is scrambled with the RNTI. The UE decodes a DCI, determines the CRC, and compares the determined CRC with the de-scrambled received CRC and if it matched the UE knows the DCI was intended for it. DL assignments received with differently scrambled DCI can be mapped to different HARQ codebook configurations. Note that multiple RNTI can point to the same HARQ codebook configuration. An indication of the codebook to be selected may be represented by such use of RNTI.

Selection based on PUCCH resource may be considered. A PUCCH resource or a PUCCH format can be (via configuration) associated with a HARQ codebook configuration. From the DCI, and/or via other information, the UE may know on which PUCCH resource to transmit HARQ feedback for the current DL transmission. Based on the PUCCH resource, the UE may select which HARQ codebook configuration to use. Note that multiple PUCCH resources/formats can point to the same HARQ codebook configuration.

In NR, a UE can be configured with multiple bandwidth parts. A HARQ codebook configuration can be associated with a bandwidth part, and depending on the bandwidth part of the transmission, a different HARQ codebook configuration may be used. Different bandwidth parts can be configured with different numerologies, i.e. also a numerology can be associated with a HARQ codebook configuration and depending which numerology is used for PDCCH and/or PDSCH a certain HARQ codebook configuration is selected. Several bandwidth parts/numerologies can point to the same HARQ codebook configuration.

NR supports multiple PUCCH/Cell groups. A PUCCH group is a set of DL component carriers together with an UL component carrier which is used for HARQ feedback of the DL carriers in the group. Different PUCCH groups can be associated with different HARQ codebook configurations, especially dynamic vs. semi-statically configured HARQ codebook.

Scheduling one or different carriers within the same PUCCH/Cell group can be associated with different HARQ codebook configurations. Further, if the UE is scheduled on at least one Scell within a PUCCH group, a certain HARQ codebook configuration may be selected for all scheduled carriers, while if the UE is only scheduled on for example the primary cell, or another specific cell, another HARQ codebook configuration applies. The same aspect described here as carriers or cells can also be based on search space, DCI message, CORESET, bandwidth part and so on.

In some cases, a UE may already have a HARQ feedback acknowledgement process ongoing on a first PUCCH resource, and may use a first HARQ codebook configuration. If the UE is instructed or configured—while the first HARQ feedback acknowledgement process is still ongoing—to provide HARQ feedback on a second PUCCH resource, it may select a second HARQ codebook configuration. With ongoing HARQ feedback acknowledgement process is may be referred to the UE having received at least one PDCCH indicating that for an associated PDSCH feedback signaling should be provided on the first PUCCH resource, and the time window to use the first PUCCH resource has not yet been closed (determined by the UE processing time to determine HARQ feedback).

More generally, a PDCCH as well as the scheduled PDSCH have certain properties, several examples of which have been discussed. Different HARQ codebook configurations can be associated with different values of such a property or with value combinations for different parameter combinations.

The approaches are also applicable to sidelink or gNB-gNB communication.

Figure 4:
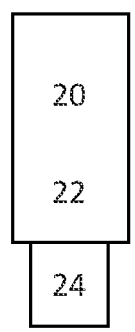
FIG. 4, showing an exemplary radio node implemented as a user equipment.

FIG. 4 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 5:
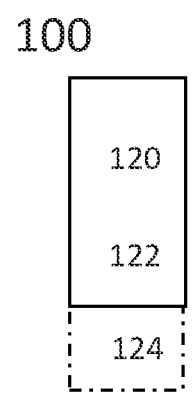
FIG. 5, showing an exemplary radio node implemented as a network node.

FIG. 5 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, and/or indicate quality of service and/or latency and/or data throughput and/or prioritisation, in particular they may indicate a capability to provide such, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or one or more data channel/s. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular)

user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more sy and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

Contention-based and/or grant-free transmission and/or access may be based on resource/s that are not specifically scheduled or reserved for the transmission or a specific device (or group of devices in some cases), and/or comprise transmission that is not unambiguously associatable, by the receiver, with a transmitter, e.g. based on the resources used for transmission.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A resource pool generally may indicate and/or comprise resources, in particular time-frequency resources, e.g. time and frequency intervals, which may be contiguous or interrupted, and/or code resources. A resource pool may in particular indicate and/or comprise resource elements and/or resource blocks, e.g. PRBs. A radio node like a user equipment may be considered to be configured with a resource pool if it received corresponding control signaling configuring it therewith. Such control signaling may in particular be transmitted by a receiving radio node as described herein. The control signaling may in particular be higher layer signaling, e.g. MAC and/or RRC signaling, and/or may be semi-static or semi-persistent. In some cases, the responding radio node or user equipment may be considered configured with a resource pool, if it is informed about a corresponding configuration, e.g. that it may access resources in the pool for transmitting. Such a configuration in some cases may be predefined, e.g. based on a standard and/or default configuration. A resource pool may be dedicated to one responding radio node or user equipment, or in some cases shared between several. It may be considered that a resource pool may be general, or for specific types of signaling, e.g. control signaling or data signaling. A transmission resource pool may in particular be for control signaling, e.g. uplink control signaling and/or sidelink control signaling, and/or may be dedicated to the user equipment/responding radio node. It may be considered that a resource pool comprises a plurality of resource structures, which may be arranged in subpools or groups, e.g. pertaining and/or according to type of (received or scheduled) signaling or type of response control signaling. Each group or subpool may comprise a number of resource structures, wherein the number may be representable by an indicator and/or bit field of the selection control information. For example, the maximum number of resource structures in a group may correspond to the maximum number of different values representable by the bit field or indicator. Different groups may have different numbers of resource structures. It may generally be considered that a group comprises a smaller number of resource structures than representable by the indicator or bit field. A resource pool may represent a search space and/or space of availability of resources and/or resource structures available for specific signaling. In particular, a transmission resource pool may be considered to represent a (time/frequency and/or code) domain or space of resources available for response control signaling.

A signaling characteristic may represent resources and/or resource structures in a reception resource pool, which may be different from the transmission resource pool. Resources and/or resource structures representing signaling characteristics of characterising signaling, in particular downlink (or sidelink) control signaling, and/or a corresponding pool, may in particular comprise one or more CORESETs (COntrol REsource SETs), each of which may represent a group or subpool. A CORESET may be associated to a specific time interval, in particular in a transmission timing structure like a slot, e.g. one or more symbols. It may be considered that a first CORESET is configured for the 1, 2, or 3 first symbols in a slot. A second CORESET may be configured for one or more later symbols, e.g. the 5th and/or 6th symbol of the same slot. In this case, the second CORESET may in particular correspond to mini-slot related signaling, e.g. comprise resource structures associated to short (e.g., 1 or 2 symbols) response control signaling, and/or a short latency requirement (e.g., 1 or 2 symbols), and/or received or scheduled transmission in a mini-slot and/or in response to a mini-slot, e.g. mini-slot data signaling. The first CORESET may be associated to slot-based signaling, e.g. long data signaling (e.g., longer than 2, 3 or 4 symbols), and/or response control signaling with relaxed latency requirement (e.g., more than 1 or 2 symbols, and/or allowing transmission in a later transmission timing structure like a later slot or subframe), and/or long response control signaling, e.g. longer than 2 or 3 or 4 symbols. Generally, different CORESETs may be separated in time domain by at least 1 symbol, in particular by 1, 2, 3 or 4 symbols. Depending in which of the groups or subpools, in particular CORESETs, characterising signaling is received, it may be associated to a specific subpool or group of the transmission resource pool. A reception resource pool may be predefined and/or configured to the responding radio node, e.g. by the receiving radio node, which may alternatively or additionally configure the transmission resource pool. Pool configuration may generally be predefined, or performed by the network or a network node (e.g., a receiving radio node), or another responding radio node taking the corresponding functionality and/or also operating as a receiving radio node, e.g. in sidelink communication (in which the configuration may be performed by another UE, or the network/network node).

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node.

Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers. A resource pool or region or set may generally comprise one or a plurality (in particular, two or a multiple of two larger than two) of resources or resource structures. A resource or resource structure may comprise one or more resource elements (in particular, two or a multiple of two larger than two), or one or more PRBs or PRB groups (in particular, two or a multiple of two larger than two), which may be continuous in frequency.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically. In general, a configuration, in particular the feedback configuration and/or a codebook configuration or a set thereof, may be configured based on one or more messages. Such messages may be associated to different layers, and/or there may be at least one message for dynamical configuration and/or at least one message for semi-static configuration. Different messages may configure different or similar or the same parameter/s and/or setting/s; in some cases, dynamic configuration, e.g. with DCI/SCI signaling, may override semi-static configuration, and/or may indicate a selection from a set of configurations, which may e.g. be predefined and/or configured with higher layer/semi-static configuration. In particular, a configuration like a feedback configuration may be configured with one or more Radio Resource Control (RRC) messages and/or one or more Medium Access Control (MAC) messages and/or one or more Control Information messages, e.g. Downlink Control Information (DCI) messages and/or Sidelink Control Information (SCI) messages.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Transmitting feedback signaling may be based on, and/or comprise, determining feedback information, e.g. one or more bits representing the feedback information. Determining feedback information may comprise performing demodulation and/or error decoding and/or error detection and/or error correction, and/or determining one or more bits of acknowledgement information, e.g. pertaining to the subject transmission, and/or represented by an associated subpattern. Alternatively, or additionally, it may comprise performing measurement/s on the subject transmission, e.g. for demodulation, and/or for providing measurement information and/or for measurement reporting. In some cases, it may comprise determining a scheduling request, and/or providing scheduling-related information, e.g. regarding a buffer status. Transmitting feedback signaling may generally comprise, and/or be based on, determining feedback information, e.g. one or more feedback or ACK/NACK bits. Such determining may comprise performing error decoding, e.g. based on error coding bits, e.g. CRC and/or FEC bits associated to the subject transmission, e.g. data or control information, which may be included in the subject transmission. Error decoding may comprise correcting information, for example based on FEC bits. The error coding bits may be determined based on the information content bits, e.g. utilising an error coding scheme like CRC, and/or polar coding or LDPC coding or Reed Muller coding. The information content may be represented by bits. The information, and in some cases error coding bits associated thereto like error detection bits and/or error correction bits, like CRC and/or FEC bits, may be considered to represent one or more data structures or substructures, for each of which one or more feedback bits, e.g. to indicate ACK or NACK, may be included in the acknowledgement feedback. Thus, at least one bit may be provided for a data structure and/or the whole of the information and/or a message carrying it, and/or one bit may be provided for one or more substructures thereof, to which corresponding error coding may be associated and/or provided, e.g. in the message or signaling. A message may be considered to be similar to a transport block and/or a code block group. One or more acknowledgement process identifiers like a HARQ or ARQ identifier may be associated to the subject transmission. A bit subpattern representing reception (e.g., ACK/NACK or DTX/DRX) may be generally associated to the information in the acknowledgement feedback (acknowledgment feedback may refer to feedback information representing acknowledgement information).

Control information may generally be transmitted in a control message, e.g. on a physical layer or channel, e.g. as a dynamic message like a DCI message or SCI message. A control message may be a command type message, which may comprise, and/or consist of, command type information; or a scheduling type message, which may comprise scheduling information, e.g. scheduling data signaling. Control information may comprise scheduling type control information (or, shorter, scheduling type information), e.g. control information indicating resources and/or transmission parameters for reception of signaling, and/or control information indicating resources and/or transmission parameters for transmission of signaling. The signaling may in particular be data signaling, e.g. on a data channel. Control information may in particular comprise, or consist of, command type control information, and/or be included into a command type message. In general, control information or control message, e.g. DCI or SCI messages, may be distinguished between scheduling type information/messages and command type information/messages. A scheduling type message may schedule transmission on a data channel (data signaling), e.g. for reception or transmission for the target radio node, e.g. in downlink or uplink, respectively. Scheduling grant and scheduling assignment are examples of such scheduling type messages. A command type message may be a message of a different type, e.g., not scheduling transmission on a data channel. A command type message may comprise a set of instructions, which may be configurable or flexible. The instructions may be scheduling-independent. Command type information may for example indicate and/or instruct switching of bandwidth, e.g. to another bandwidth part, and/or activation or deactivation of a carrier and/or cell and/or bandwidth part, and/or activation or deactivation of grant-free transmissions, and/or indications of selection a parameter or configuration out of a set of configured parameters or configurations. In some variants, a command type message may be scheduling independent such that it does not schedule data signaling, or it may have a structure in which such scheduling may be configurable or optional. For the command type, there may be no scheduled transmission based on which reception of the control information may be inferred. It should be noted that scheduling type messages may comprise command type information. Feedback information may be considered a form of control information, in particular UCI or SCI, depending on communication direction or mode. Feedback signaling may be considered a form of control signaling. A control message comprising feedback information may be considered to be of a further type, which may be referred to as feedback type message, which may include a request for resources or in general UCI or UCI-like information in sidelink or backhaul or relay link.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement or substructure of a data element or data block like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Rate-matching may comprise including the rate-matched information into a bit-stream before encoding and/or modulating, e.g. replacing bits of data. Puncturing may comprise replacing modulated symbols with modulated symbols representing the punctured information.

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

Operational conditions may pertain to load of the RAN, or application or use case of transmission or signaling, and/or quality of service (QoS) conditions (or requirements) for a transmission or signaling. QoS may for example pertain to data rate and/or priority and/or latency and/or transmission quality, e.g. BLER or BER. Use for URLLC may be considered a quality of service-related condition.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

ABBREVIATION EXPLANATION

ACK/NACK Acknowledgment/Negative Acknowledgement
ARQ Automatic Repeat reQuest
CAZAC Constant Amplitude Zero Cross Correlation
CBG Code Block Group
CDM Code Division Multiplex
CM Cubic Metric
CORESET Control channel Resource Set
CQI Channel Quality Information
CRC Cyclic Redundancy Check
CRS Common reference signal
CSI Channel State Information
CSI-RS Channel state information reference signal
DAI Downlink Assignment Indicator
DCI Downlink Control Information
DFT Discrete Fourier Transform
DM(-)RS Demodulation reference signal(ing)
FDD/FDM Frequency Division Duplex/Multiplex
HARQ Hybrid Automatic Repeat Request
IFFT Inverse Fast Fourier Transform
MBB Mobile Broadband
MCS Modulation and Coding Scheme
MIMO Multiple-input-multiple-output
MRC Maximum-ratio combining
MRT Maximum-ratio transmission
MU-MIMO Multiuser multiple-input-multiple-output
OFDM/A Orthogonal Frequency Division Multiplex/Multiple Access
PAPR Peak to Average Power Ratio
PDCCH Physical Downlink Control Channel
PDSCH Physical Downlink Shared Channel
PRACH Physical Random Access CHannel
PRB Physical Resource Block
PUCCH Physical Uplink Control Channel
PUSCH Physical Uplink Shared Channel
(P)SCCH (Physical) Sidelink Control Channel
(P)SSCH (Physical) Sidelink Shared Channel
QoS Quality of Service
RB Resource Block
RNTI Radio Network Temporary Identifier
RRC Radio Resource Control
SC-FDM/A Single Carrier Frequency Division Multiplex/Multiple Access
SCI Sidelink Control Information
SINR Signal-to-interference-plus-noise ratio
SIR Signal-to-interference ratio
SNR Signal-to-noise-ratio
SR Scheduling Request
SRS Sounding Reference Signal(ing)
SVD Singular-value decomposition
TDD/TDM Time Division Duplex/Multiplex
UCI Uplink Control Information
UE User Equipment
URLLC Ultra Low Latency High Reliability Communication
VL-MIMO Very-large multiple-input-multiple-output
ZF Zero Forcing Abbreviations may be considered to follow 3GPP usage if applicable.

The invention claimed is:

1. A method of operating a feedback radio node in a radio access network, the feedback radio node being configured with a set of feedback codebooks, each codebook of the set indicating an arrangement of one or more subpatterns of feedback bits into feedback information, the method comprising:
   transmitting feedback signaling representing feedback information determined based on a codebook selected from the set of feedback codebooks, the feedback information corresponding to a plurality of subject transmissions and being scheduled for transmission on a same resource.

2. The method according to claim 1, wherein at least one feedback codebook is a HARQ codebook.

3. The method according to claim 1, wherein the codebook is selected based on an indication received with control information.

4. The method according to claim 1, wherein the codebook is selected based on resources scheduled for transmission of the feedback signaling.

5. The method according to claim 1, wherein the codebook is selected based on a format indicated for the feedback signaling.

6. The method according to claim 1, wherein the feedback signaling is based on a transmission codebook determined based on the selected codebook—by changing the selected codebook based on a received feedback control indication.

7. The method according to claim 1, wherein a subpattern of bits of the feedback information pertains to one of control signaling and data signaling.

8. The method according to claim 1, wherein at least one feedback codebook of the set comprises one or more subpatterns pertaining to control signaling.

9. The method according to claim 1, wherein different feedback codebooks pertain to at least one of:
   different carriers;
   different carrier arrangements;
   different types of signaling; and
   different types of control signaling.

10. The method according to claim 1, wherein at least one feedback codebook of the set comprises at least one subpattern pertaining to a code block group.

11. A feedback radio node for a radio access network, the feedback radio node comprising processing circuitry being configured:
   to be configured with a set of feedback codebooks, each codebook of the set indicating an arrangement of one or more subpatterns of feedback bits into feedback information; and
   to cause the feedback radio node to transmit feedback signaling representing feedback information determined based on a codebook selected from the set of feedback codebooks, the feedback information corresponding to a plurality of subject transmissions and being scheduled for transmission on a same resource.

12. A method of operating a signaling radio node in a radio access network, the method comprising:
   configuring a feedback radio node with a set of feedback codebooks, each codebook of the set indicating an arrangement of one or more subpatterns of feedback bits into feedback information; and
   receiving feedback signaling representing feedback information determined based on a codebook selected from the set of feedback codebooks, the feedback information corresponding to a plurality of subject transmissions and being scheduled for transmission on a same resource.

13. The method according to claim 12, wherein at least one feedback codebook is a HARQ codebook.

14. The method according to claim 12, wherein the codebook is selected based on an indication received with control information.

15. The method according to claim 12, wherein the codebook is selected based on resources scheduled for transmission of the feedback signaling.

16. The method according to claim 12, wherein the codebook is selected based on a format indicated for the feedback signaling.

17. The method according to claim 12, wherein the feedback signaling is based on a transmission codebook determined based on the selected codebook by changing the selected codebook based on a received feedback control indication.

18. The method according to claim 12, wherein a subpattern of bits of the feedback information pertains to one of control signaling and data signaling.

19. A signalling radio node for a radio access network, the signaling radio node comprising processing circuitry being configured to:
   configure a feedback radio node with a set of feedback codebooks, each codebook of the set indicating an arrangement of one or more subpatterns of feedback bits into feedback information; and
   cause the signalling radio node to receive feedback signaling representing feedback information determined based on a codebook selected from the set of feedback codebooks, the feedback information corresponding to a plurality of subject transmissions and being scheduled for transmission on a same resource.

20. A non-transitory computer storage medium storing a computer program comprising instructions that, when executed, cause processing circuitry to at least one of control and perform a method of operating a feedback radio node in a radio access network, the feedback radio node being configured with a set of feedback codebooks, each codebook of the set indicating an arrangement of one or more subpatterns of feedback bits into feedback information, the method comprising:
   transmitting feedback signaling representing feedback information determined based on a codebook selected from the set of feedback codebooks, the feedback information corresponding to a plurality of subject transmissions and being scheduled for transmission on a same resource.

* * * * *

UNITED STATES PATENT AND TRADEMARK OFFICE
CERTIFICATE OF CORRECTION

PATENT NO. : 11,757,498 B2
APPLICATION NO. : 16/763320
DATED : September 12, 2023
INVENTOR(S) : Baldemair et al.

It is certified that error appears in the above-identified patent and that said Letters Patent is hereby corrected as shown below:

In the Specification

In Column 15, Line 31, delete "corns in the two flavors=2 bit" and insert -- comes in the two flavors =2 bit --, therefor.

In Column 17, Line 58, delete "BroadBand)" and insert -- Broadband) --, therefor.

In Column 17, Line 63, delete "CORESETS" and insert -- CORESETs --, therefor.

In Column 18, Line 44, delete "Scell" and insert -- SCell --, therefor.

In Column 18, Line 59, delete "is may" and insert -- it may --, therefor.

In Column 19, Line 29, delete "show" and insert -- shows --, therefor.

In Column 21, Line 57, delete "user of for" and insert -- user for --, therefor.

In Column 23, Line 61, delete "more sy" and insert -- more symbols --, therefor.

In Column 25, Line 7, delete "Circuitry)" and insert -- Circuit) --, therefor.

In Column 25, Line 15, delete "Read-Only-Memory (ROM)," and insert -- Read-Only Memory (ROM), --, therefor.

In Column 32, Line 28, delete "V2x communication (Vehicular communication)," and insert -- V2x (Vehicle-to-Everything) communication --, therefor.

In Column 32, Line 30, delete "V2P (Vehicle-to-Person)." and insert -- V2P (Vehicle-to-Pedestrian). --, therefor.

Signed and Sealed this
Twenty-fifth Day of June, 2024

*Katherine Kelly Vidal*
Katherine Kelly Vidal
*Director of the United States Patent and Trademark Office*

CERTIFICATE OF CORRECTION (continued)
U.S. Pat. No. 11,757,498 B2

In Column 40, Line 50, delete "channel/signaling)." and insert -- channel/signaling. --, therefor.

In Column 40, Line 62, delete "etc.)." and insert -- etc. --, therefor.

In Column 41, Line 54, delete "CAZAC Constant Amplitude Zero Cross Correlation" and insert -- CAZAC Constant Amplitude Zero AutoCorrelation --, therefor.

In Column 41, Line 58, delete "CORESET Control channel Resource Set" and insert -- CORESET Control Resource Set --, therefor.

In Column 42, Lines 37-38, delete "URLLC Ultra Low Latency High Reliability Communication" and insert -- URLLC Ultra-Reliable Low Latency Communication --, therefor.

In the Claims

In Column 43, Line 3, in Claim 6, delete "codebook—by" and insert -- codebook by --, therefor.